United States Patent Office 3,763,219
Patented Oct. 2, 1973

3,763,219
1-(2'-CYCLOHEXYLIDENIMINOPHENYL)-
3-ALKOXYCARBONYL-2-THIOUREAS
Arno Widdig, Blecher, Ferdinand Grewe, Burscheid, and Hans Scheinpflug and Paul-Ernst Frohberger, Leverkusen, Germany, assignors to Bayer Aktiengesellschaft, Leverkusen, Germany
No Drawing. Filed Mar. 21, 1972, Ser. No. 236,586
Claims priority, application Germany, Mar. 27, 1971,
P 21 14 882.3
Int. Cl. C07c 157/12
U.S. Cl. 260—470  3 Claims

ABSTRACT OF THE DISCLOSURE 1-(2'-cyclohexylideniminophenyl) - 3 - alkoxycarbonyl-2-thioureas of the general formula

[Structure I: phenyl ring with X substituent, N=cyclohexyl with $R_n$, and NH—C(=S)—NH—COOR' group]  (I)

in which
X is hydrogen or alkyl with 1 to 6 carbon atoms,
$n$ is 0, 1, 2 or 3,
R is lower alkyl, and
R' is alkyl with 1 to 6 carbon atoms, which possess fungicidal, bactericidal, insecticidal and acaricidal properties.

---

The present invention relates to and has for its objects the provision of particular new 1 - (2' - cyclohexylideniminophenyl)-3-alkoxycarbonyl-2-thioureas which may be alkyl substituted on the cyclohexane or phenyl rings, which possess fungicidal, bactericidal, insecticidal and acaricidal properties, active compositions in the form of mixtures of such compounds with solid and liquid dispersible carrier vehicles, and methods for producing such compounds and for using such compounds in a new way especially for combating pests, e.g. fungi, bacteria, insects and acarids, especially fungi, with other and further objects becoming apparent from a study of the within specication and accompanying examples.

It has been disclosed in U.S. Pat. 2,457,674 that dithiocarbamates, for example zinc ethylene-1,2-bis-dithiocarbamate, can be used as fungicides. However, this compound does not always exhibit a satisfactory activity when used at low concentrations. It has furthermore been disclosed in German published specification 1,930,540 that individual thioureidobenzenes possess a good fungicidal activity; from amongst this series, 1,1'-o-phenylene-bis-(3,3'-ethoxy-carbonyl-thiourea) (Compound A), in particular, has become important. However, the activity of even this compound is not entirely satisfactory against some fungi from the class of Ascomycetes.

The present invention provides, as new compounds, the cyclohexylideniminophenyl-thioureas of the general formula

[Structure I: phenyl with X, N=cyclohexyl with $R_n$, NH—C(=S)—NH—COOR']  (I)

in which
X is hydrogen or alkyl with 1 to 6 carbon atoms,
$n$ is 0, 1, 2 or 3,
R is lower alkyl, and
R' is alkyl with 1 to 6 carbon atoms.

In this formula, X is preferably hydrogen or lower alkyl with up to 4 carbon atoms and R is preferably methyl or ethyl. R' is preferably lower alkyl with up to 4 carbon atoms.

The compounds of the Formula I have been found to display strong fungicidal properties.

The present invention also provides a process for the preparation of a cyclohexylideniminophenyl-thiourea of the Formula I in which a spiro - (benzimidazoline - 2,1'-cyclohexane) of the general formula

[Structure II: benzimidazoline with X, spiro-cyclohexane with $R_n$]  (II)

in which
X, R and $n$ have the meanings stated above, is reacted with an isothiocyanate of the general formula $$R'OOC—N=C=S$$  (III)

in which
R' has the meaning stated above, in the presence of a diluent which term, of course, includes a solvent.

It must be described as distinctly surprising that the thioureas according to the present invention display a higher fungicidal activity than zinc ethylene-1,2-bis-dithiocarbamate (Compound B) and 1,1'-o-phenylene-bis-(3,3'-ethoxy-carbonyl-thiourea). The compounds according to this invention therefore represent a significant enrichment of the art.

If spiro - (benzimidazoline - 2,1' - cyclohexane) and ethoxy-carbonyl-isothiocyanate are used as the starting materials, the course of the reaction can be represented by the following equation:

[Structure IIa: benzimidazoline spiro-cyclohexane] + $S=C=N—COOC_2H_5$ ⟶

(IIa)  (IIIa)

[Structure IV: phenyl with N=cyclohexyl and NH—C(=S)—NH—COOC_2H_5]  (IV)
(1)

The spiro-(benzimidazoline-2,1'-cyclohexanes) of the Formula II are in part known from Chemische Berichte 98, 2681 (1965); they can be prepared from o-phenylene-diamines and cyclohexanones. As examples of the spiro-(benzimidazoline-2,1'-cyclohexanes) that are to be used as starting materials, there may be mentioned:

spiro-[benzimidazoline-2,1'-(2'-methylcyclohexane)],
spiro-[benzimidazoline-2,1'-(3'-methylcyclohexane)],
spiro-[benzimidazoline-2,1'-(4'-methylcyclohexane)],
spiro-[benzimidazoline-2,1'-(3',5'<sub>2</sub>5'-trimethylcyclohexane)],
spiro-[(5-ethyl-benzimidazoline)-2,1'-cyclohexane],
spiro-[(5-isopropyl-benzimidazoline)-2,1'-cyclohexane]
and
spiro-[(5-n-butyl-benzimidazoline)-2,1'-cyclohexane].

The isothiocyanates of the Formula III are in part known from J. Chem. Soc. 93, 698 (1908). They can be obtained from alkali metal isothiocyanates and haloformic acid esters. As examples of the isothiocyanates to be used according to the invention there may be mentioned: methoxycarbonyl-isothiocyanate, ethoxycarbonyl-isothiocyanate, isopropoxycarbonyl-isothiocyanate and sec.-butoxycarbonyl-isothiocyanate.

As diluents in carrying out the process according to the invention, all inert organic solvents are suitable, especially hydrocarbons, such as benzine, ligroin, hexane, benzene and toluene; chlorinated hydrocarbons such as methylene chloride, chloroform, carbon tetrachloride and chlorobenzene; ethers, such as diethyl ether, dibutyl ether, tetrahydrofuran and dioxane; ketones, such as acetone and methyl isopropyl ketone; esters, such as ethyl acetate, and also any desired mixtures of such solvents.

The reaction temperature can be varied over a fairly wide range. In general, the reaction is carried out at from about 0° to 100° C., preferably from about 15° to 70° C.

In carrying out the process according to the invention, 1 mole of isothiocyanate is preferably used per mole of spiro-(benzimidazoline-2,1'-cyclohexane), but lesser or greater amounts, by up to 20%, do not result in a significant loss in yield. The end products are obtained as crystals on cooling the reaction mixture and can be separated off by filtration and can be purified by redissolving and reprecipitating, or by recrystallization.

A preferred embodiment of the process is to prepare the isothiocyanate that is to be used, in an inert solvent, from the appropriate haloformic ester and an alkali metal isothiocyanate, and to react it, without isolation, directly with the spiro-(benzimidazoline-2,1'-cyclohexane).

The active compounds according to the invention exhibit a strong fungitoxic activity and are distinguished by a broad activity spectrum. Fungitoxic agents in crop protection are used for the control of fungi from the most diverse classes of fungi, such as Archimycetes, Phycomycetes, Ascomycetes, Basidiomycetes and Fungi Imperfecti.

The active compounds according to the present invention possess not only the good properties of outstanding commercial preparations but also other considerable advantages. These lie primarily in the ability of the compounds of this invention to penetrate into the plant to be conducted systemically and to come into action fungitoxically at a distance from the place of application. They can be taken up by the seed surface, by the roots and also by above-the-soil plant organs after external application. They also possess the advantageous ability to come into action locosystemically, that is to exercise a deep effect in the plant tissue and eliminate pathogenic fungal organisms that have already penetrated into the tissue of the host plant. The present compounds also show a considerably better effeciveness than the known commercial preparations against various fungal causative organisms of plant diseases, for example against apple scab, Piricularia, Pellicularia, bunt of wheat and several phytopathogenic soil fungi.

The compounds according to this invention are also effective against phytopathogenic bacteria; they also show insecticidal and acaricidal activity.

As crop-protection agents the compounds according to the invention can be used for soil treatment, for seed treatment and for the treatment of above-the-soil parts of plants. They are particularly effective against *Fusicladium dendriticum, Erysiphe cichoracearum, Podosphaera leucotricha, Piricularia oryzae, Pellicularia sasakii, Tilletia tritici, Erysiphe graminis, Sclerotinia sclerotiorum, Verticillium alboatrum, Thielaviopsis basicola, Fusarium culmorum, Fusarium dianthi* and *Phialophora cinerescens.*

The substances according to the invention are well tolerated by plants. They possess only a low toxicity towards warm-blooded animals and because of their good toleration by human skin they are not unpleasant to handle.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylenes, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, bactericides, insecticides and acaricides, or rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.005–0.5%, preferably 0.001–2%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.001–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. fungi, bacteria, insects and acarids, and more particularly methods of combating fungi which comprises applying to at least one of correspondingly (a) such fungi, (b) such bacteria, (c) such insects, (d) such acarids and (e) the corresponding habitat thereof, i.e. the locus to be protected, a correspondingly combative or toxic amount, i.e. fungicidally, bactericidally, insecticidally or acaricidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating and the like.

In the case of seed treatment, there are required, in general, amounts of active compound of about 0.01 to 50 g., preferably 0.5–5 g., per kilogram of seed.

For soil treatment, amounts of active compound of about 1–1000 g., preferably from 10–200 g., per cubic meter of soil are generally necessary.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Erysiphe test:
Solvent: 4.7 parts by weight acetone
Emulsifier: 0.3 part by weight alkylaryl polyglycol ether
Water: 95.0 parts by weight The amount of the active compound required for the desired concentration of active compound in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23–24° C. and at a relative atmospheric humidity of about 75%.

After 12 days, the infection of the cucumber plants is determined as a percentage of the untreated but also inoculated control plants. 0% means no infection; 100% that the infection is exactly as great as in the case of the control plants.

The active compounds, the concentrations of the active compounds and the results obtained can be seen from the following Table 1:

TABLE 1.—ERYSIPHE TEST

| Active compound | Infection as a percentage of the infection of the untreated control with a concentration of active compound (in percent) of 0.0062 |
|---|---|
| (A) [phenyl–NH–C(=S)–NH–COOC₂H₅ and –NH–C(=S)–NH–COOC₂H₅] (Known) | 37 |
| (1) [phenyl–N=⟨⟩ and –NH–C(=S)–NH–COOC₂H₅] | 20 |

EXAMPLE 2

Erysiphe test/systemic:
Solvent: 4.7 parts by weight acetone
Dispersing agent: 0.3 part by weight alkylaryl polyglycol ether
Water: 95 parts by weight The amount of the active compound required for the desired concentration in the liquid to be used for watering is mixed with the stated amount of the solvent, and the concentrate is diluted with the stated amount of water containing the stated additions.

Cucumber plants grown in standard soil are, in the one- to two-leaf stage, watered three times within one week with 20 ml. of the above-identified liquid, containing the stated concentration of active compound per 100 ml. of soil.

The plants so treated are, after the treatment, inoculated with conidia of the fungus *Erysiphe cichoracearum*. The plants are subsequently placed in a greenhouse at 23–24° C. and a relative atmospheric humidity of 70%.

After 12 days, the infection of the cucumber plants is determined as a percentage of the untreated but also inoculated control plants. 0% means no infection; 100% means that the infection is exactly as great as in the case of the control plants.

The active compounds, the concentrations of the active compounds and the results obtained can be seen from the following Table 2:

TABLE 2.—ERYSIPHE TEST (SYSTEMIC)

| Active compound | Infection as a percentage of the infection of the untreated control with a concentration of active compound (in p.p.m.) of 30 |
|---|---|
| (A) [phenyl–NH–C(=S)–NH–COOC₂H₅ and –NH–C(=S)–NH–COOC₂H₅] (Known) | 100 |
| (1) [phenyl–N=⟨⟩ and –NH–C(=S)–NH–COOC₂H₅] | 53 |

EXAMPLE 3

Podosphaera test (powdery mildew of apples) [protective]:

Solvent: 4.7 parts by weight acetone
Emulsifier: 0.3 part by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apply seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the appls powdery mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from the following Table 3:

TABLE 3.—PODOSPHAERA TEST (PROTECTIVE)

| Active compound | Infection as a percentage of the infection of the untreated control with a concentration of active compound (in percent) of 0.0062 |
|---|---|
| (A) $\phantom{xx}$ ⟨Ph⟩—NH—C(=S)—NH—COOC$_2$H$_5$ / ⟨Ph⟩—NH—C(=S)—NH—COOC$_2$H$_5$ (Known) | 15 |
| (1) $\phantom{xx}$ ⟨Ph⟩—N=⟨cyclohexyl⟩ / ⟨Ph⟩—NH—C(=S)—NH—COOC$_2$H$_5$ | 0 |

EXAMPLE 4

Podosphaera test (systemic):

Solvent: 4.7 parts by weight acetone
Dispersing agent. 0.3 part by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered three times within one week with 20 ml. of the above-identified liquid, containing the stated concentration of active compound, per 100 ml. of soil. The plants so treated are, after the treatment, inoculated with conidia of *Podosphaera leucotricha* Salm. and placed in a greenhouse at a temperature of 21–23° C. and at a relative atmospheric humidity of about 70%. 10 days after the inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results obtained can be seen from the following Table 4:

TABLE 4.—PODOSPHAERA TEST (SYSTEMIC)

| Active compound | Infection as a percentage of the infection of the untreated control with a concentration of active compound (in p.p.m.) of 30 |
|---|---|
| (A) $\phantom{xx}$ ⟨Ph⟩—NH—C(=S)—NH—COOC$_2$H$_5$ / ⟨Ph⟩—NH—C(=S)—NH—COOC$_2$H$_5$ (Known) | 49 |
| (1) $\phantom{xx}$ ⟨Ph⟩—N=⟨cyclohexyl⟩ / ⟨Ph⟩—NH—C(=S)—NH—COOC$_2$H$_5$ | 24 |

EXAMPLE 5

Fusicladium test (systemic):

Solvent: 4.7 parts by weight acetone
Emulsifier: 0.3 part by weight alkylaryl polyglycol ether
Water: 95 parts by weight The amount of the active compound required for the desired concentration of the active compound in the liquid to be used for watering is mixed with the stated amount of solvent, and the concentrate is diluted with the stated amount of water which contains the stated addition.

Apple seedlings grown in standard soil are, in the 3–4 leaf stage, watered once in one week with 20 ml. of the above-identified liquid, containing the stated concentration of active compound, per 100 ml. of soil.

The plants so treated are, after the treatment inoculated with an aqueous conidium suspension of *Fusicladium dendriticum* Fuckel and incubated for 18 hours in a humidity chamber at 18–20° C. and at a relative atmospheric humidity of 100%. The plants then again are placed in a greenhouse for 14 days.

15 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results obtained can be seen from the following Table 5:

TABLE 5.—FUSICLADIUM TEST (SYSTEMIC)

| Active compound | Infection as a percentage of the infection of the untreated control with a concentration of active compound of 60 p.p.m. |
|---|---|
| (A) $\phantom{xx}$ ⟨Ph⟩—NH—C(=S)—NH—COOC$_2$H$_5$ / ⟨Ph⟩—NH—C(=S)—NH—COOC$_2$H$_5$ (Known) | 27 |
| (1) $\phantom{xx}$ ⟨Ph⟩—N=⟨cyclohexyl⟩ / ⟨Ph⟩—NH—C(=S)—NH—COOC$_2$H$_5$ | 4 |

EXAMPLE 6

Piricularia and Pellicularia test:
  Solvent: 1.9 parts by weight dimethyl formamide
  Dispersing agent: 0.1 part by weight alkylarylpolyglycol ether
  Water: 98 parts by weight water The amount of active compound required for the desired concentration of active compound in the spray liquor is mixed with the stated amount of solvent, and the concentrate is diluted with the stated amount of water containing the stated addtiive.

2 batches each consisting of 30 rice plants about 2–4 weeks old are sprayed with the spray liquor until dripping wet. The plants remain in a greenhouse at temperatures of 22 to 24° C. and a relative atmospheric humidity of about 70% until they are dry. One batch of the plants is then inoculated with an aqueous suspension of 100,000 to 200,000 spores/ml. of *Piricularia oryzae* and placed in a chamber at 24–26° C. and 100% relative atmospheric humidity. The other batch of the plants is infected with a culture of *Pellicularia sasakii* grown on malt agar and placed at 28–30° C. and 100% relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0% means no infection; 100% means that the infection is exactly as great in the case of the control plants.

The active compounuds, the concentrations of the active compounds and the results obtained can be seen from the following Table 6:

Additional test/curative fungicidal action

In order to ascertain the curative fungicidal action, the above test is repeated, except that the given active compound is applied not before, but only 16 hours after, inoculation.

The particular active compounds tested, their concentrations, and the results obtained can be seen from the following Table 6:

TABLE 6.—PIRICULARIA (A) AND PELLICULARIA (B) TEST

| Active compound | | Infection as a percentage of the infection of the untreated control with a concentration of active compound (in percent) of— | | | |
|---|---|---|---|---|---|
| | | (A) | | (B) | |
| | | 0.05 | 0.025 | 0.025 | 0.01 |
| (A) $\begin{array}{c}\text{—NH—C—NH—COOC}_2\text{H}_5\\\text{‖}\\\text{S}\end{array}$ (two such groups on benzene ring) (Known) | Pr | 25 | 100 | 25 | 50 |
| (1) $\begin{array}{c}\text{—N=}\bigcirc\\\text{—NH—C—NH—COOC}_2\text{H}_5\\\text{‖}\\\text{S}\end{array}$ | Pr | 0 | 0 | 0 | 13 |
| | Cur | 25 | | | |

Note.—Pr.=protective. Cur.=curative.

EXAMPLE 7

Verticillium test/solid preparation of active compound:
  Solvent: 10.2 parts by weight acetone
  Granulate basis: 10.2 parts by weight kaolin The amount of active compound necessary for the desired concentration of active compound in the granulate is mixed with the stated amount of solvent in a glass dish and this dish is left to stand open until the solvent has evaporated.

In order to test the protective action, egg plants about 20–25 days old are inoculated by immersion of the roots in an aqueous suspension of 1,000,000 spores/ml. of *Verticillium alboaterum*. The granulate is simultaneously mixed in under the growth substrate—a mixture of standard soil and sand—and the inoculated egg plants are dropped into this. The test specimens are put in a chamber at +21° to 24° C. and 75% relative atmospheric humidity.

In the test of curative action, an inoculation of the egg plants takes place 14 days before addition of the granulate.

21 days after inoculation, the infection of the vascular bundles is determined as a percentage of the untreated but also inoculated control plants. 0% means no infection; 100% means that the infection is exactly as great as in the case of the control plants.

The active compounds, the concentrations of the active compounds and the results can be seen from the following Table 7:

TABLE 7.—VERTICILLIUM TEST/SOLID PREPARATION OF ACTIVE COMPOUND

| Active compound | | Infection as a percentage of the infection of the untreated control with a concentration of active compound (in p.p.m.) of— | | |
|---|---|---|---|---|
| | | 100 | 50 | 10 |
| (A) $\begin{array}{c}\text{—NH—C—NH—COOC}_2\text{H}_5\\\text{‖}\\\text{S}\end{array}$ (two such groups) (Known) | Pr | 0 | 9 | 100 |
| | Cur | 18 | | |
| (1) $\begin{array}{c}\text{—N=}\bigcirc\\\text{—NH—C—NH—COOC}_2\text{H}_5\\\text{‖}\\\text{S}\end{array}$ | Pr | 0 | 0 | |
| | Cur | 0 | | |

EXAMPLE 8

Mycelium growth test

| | Parts by weight |
|---|---|
| Agar-agar | 20 |
| Potato decoction | 200 |
| Malt | 5 |
| Dextrose | 15 |
| Peptone | 5 |
| $Na_2HPO_4$ | 2 |
| $Ca(NO_3)_2$ | 0.3 |

Proportion of solvent mixture to nutrient medium:

| | Parts by weight |
|---|---|
| Solvent mixture | 2 |
| Agar nutrient medium | 100 |

Composition of solvent mixture:

| | Parts by weight |
|---|---|
| Dimethyl formamide | 0.19 |
| Alkylarylpolyglycol ether | 0.01 |
| Water | 1.80 |

The amount of active compound required for the desired concentration of active compound in the nutrient medium is mixed with the stated amount of solvent mixture. The concentrate is thoroughly mixed in the stated proportion with the liquid nutrient medium which has been cooled to 42° C. and is then poured into Petri dishes of 9 cm. diameter. Control dishes to which the preparation has not been added are also set up.

When the nutrient medium has cooled and solidified, the dishes are inoculated with the species of fungi stated in the table and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0—no fungus growth
1—very strong inhibition of growth
2—medium inhibition of growth
3—slight inhibition of growth
4—growth equal to that of untreated control.

The active compounds, their concentrations and the results obtained can be seen from Table 8:

Solvent: Acetone
Parts by weight: (a) 1000, (b) 100

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated onto it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum

TABLE 8

| Mycelium growth test: active compounds | Concentration of active compound. p.p.m. | Verticillium albo-atrum | Fusarium dianthi | Colletotrichum coffeanum | Phialophora cinerescens | Mycosphaerella musicola |
|---|---|---|---|---|---|---|
| A) [phenyl]—NH—C(=S)—NH—COOC$_2$H$_5$ / [phenyl]—NH—C(=S)—NH—COOC$_2$H$_5$ (Known) | 5 | 2 | 4 | 4 | 0 | 0 |
| (1) [phenyl]—N=[phenyl] / [phenyl]—NH—C(=S)—NH—COOC$_2$H$_5$ | 5 | 0 | 1 | 0 | 0 | 0 |

EXAMPLE 9

Agar plate test

Test for fungitoxic effectiveness and breadth of the activity spectrum.

on to the treated substrate, similar to the spread to the untreated substrate of the control.

The active compounds, the concentration of the active compounds, the test fungi and the inhibition effects achieved can be seen from the following table:

TABLE 9.—AGAR PLATE TEST

| Active compound | | Concentration of active compound in the substrate in mg. in the litre | Sclerotinia sclerotiorum | Thielaviopsis basicola | Fusarium culmorum |
|---|---|---|---|---|---|
| Untreated | | | + | + | + |
| (B) CH$_2$—NH—C(=S)—S\\Zn / CH$_2$—NH—C(=S)—S (Known) | (a) (b) | 10 100 | + + | + + | + — |
| (1) [phenyl]—N=[phenyl] / [phenyl]—NH—C(=S)—NH—COOC$_2$H$_5$ | (a) (b) | 10 100 | 0 0 | 0 0 | + 0 |

EXAMPLE 10

Seed dressing test/bunt of wheat (seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of Tilletia tritici per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 10:

TABLE 10.—SEED DRESSING TEST/BUNT OF WHEAT

| Active compounds | Concentration of active compound in the dressing in percent by weight | Applied amount of dressing in g./kg. seed | Spore germination in percent |
|---|---|---|---|
| Non-dressed | | | >10 |
| (A) 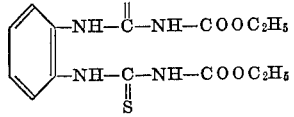 (Known) | 30 | 1 | 0.05 |
| (1) 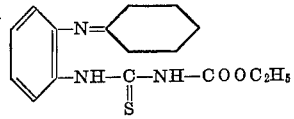 | 30 | 1 | 0.000 |
| | 10 | 1 | 0.005 |
| | 3 | 1 | 0.05 |

The preparative process of the present invention is illustrated in and by the following example:

EXAMPLE 11

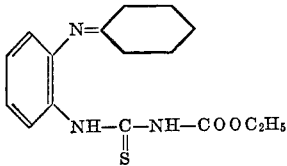

940 g. (5 moles) of spiro-(benzimidazoline-2,1'-cyclohexane) are suspended in 1,600 ml. of ethyl acetate and 655 g. (5 moles) of ethoxycarbonyl-isothiocyanate in 200 ml. of ethyl acetate are added in portions, while keeping the temperature at about 40° C. by slight cooling. Thereupon, a clear solution is produced. After some hours, the end product begins to crystallize, after seeding if necessary. After standing overnight, the crystals are filtered off and washed with ether. 1,180 g. of 1-(2'-cyclohexylideniminophenyl)-3-ethoxycarbonyl-2-thiourea of melting point 99° C. are obtained. The yield is 74% of theory.

Other 1 - (2'-cyclohexylideniminophenyl)-3-alkoxycarbonyl-2-thioureas which can be produced in similar manner from ethoxycarbonyl-isothiocyanate and the spiro-(benzimidazoline-2,1'-cyclohexane starting materials set forth hereinabove include:

1-[2'-(2''-methyl-cyclohexylidenimino)-phenyl]-,
1-[2'-(3''-methyl-cyclohexylidenimino)-phenyl]-,
1-[2'-(4''-methyl-cyclohexylidenimino)-phenyl]-,
1-[2'-(3'',5'',5''-trimethyl-cyclohexylidenimino)-phenyl]-,
1-(4'-ethyl-2'-cyclohexylideniminophenyl)-,
1-(4'-isopropyl-2'-cyclohexylideniminophenyl)-, and
1-(4'-n-butyl-2'-cyclohexylideniminophenyl)-3-ethoxycarbonyl-2-thiourea.

In similar fashion, the corresponding 3-methoxy-, 3-isopropoxy-, 3-n-propxy-, 3-butoxy- and other 3-alkoxycarbonyl-2-thioureas can be prepared, as well as corresponding compounds wherein the cyclohexane ring substituent is ethyl or other alkyl radicals. Such other compounds also exhibit the indicated fungicidal, bactericidal, insecticidal and acaricidal activities.

It will be appreciated that the instant specification and examples are set forth by way of illustration and not limitation, and that various modifications and changes may be made without departing from the spirit and scope of the present invention.

What is claimed is:

1. A cyclohexylideniminophenyl-thiourea of the formula

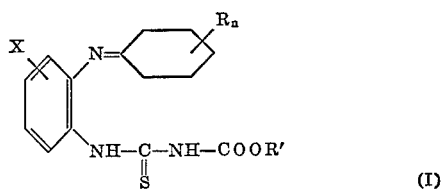

in which
X is hydrogen or alkyl with 1 to 6 carbon atoms,
n is 0, 1, 2 or 3,
R is lower alkyl, and
R' is alkyl with 1 to 6 carbon atoms.

2. A compound according to claim 1 in which X is hydrogen or alkyl with up to 4 carbon atoms, R is methyl or ethyl and R' is alkyl with up to 4 carbon atoms.

3. A compound according to claim 1 wherein such compound is 1 - (2'-cyclohexylideniminophenyl)-3-ethoxycarbonyl-2-thiourea of the formula

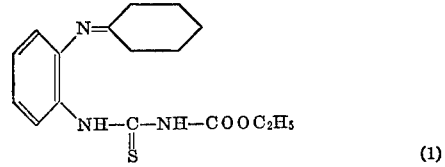

(References on following page)

References Cited

FOREIGN PATENTS

| | | | |
|---|---|---|---|
| 694,362 | 1/1970 | Suoth Africa | 280—470 |
| 1,191,406 | 5/1970 | Great Britain | 280—470 |
| 4,519,078 | 3/1970 | Japan | 280—470 |
| 1,054,777 | 4/1959 | Germany. | |

OTHER REFERENCES

Assony: "Organic Sulfur Compounds," Kharasch ed., Pergamon Press (1961), p. 332.

Staab et al.: Chem. Ber. 98, 2681 (1965).

LORRAINE A. WEINBERGER, Primary Examiner

J. F. TERAPANE, Assistant Examiner

U.S. Cl. X.R.

260—309.2, 454; 424—309